(12) United States Patent
Ehlgen et al.

(10) Patent No.: US 9,340,148 B2
(45) Date of Patent: May 17, 2016

(54) METHOD AND CONTROL UNIT FOR DISTANCE-DEPENDENT ADJUSTMENT OF THE ILLUMINATION RANGE OF A LIGHTING SYSTEM FOR A VEHICLE

(75) Inventors: Tobias Ehlgen, Ravensburg (DE); Michael Fischer, Reichenbach/Fils (DE)

(73) Assignee: ROBERT BOSCH GMBH, Stuttgart (DE)

( * ) Notice: Subject to any disclaimer, the term of this patent is extended or adjusted under 35 U.S.C. 154(b) by 291 days.

(21) Appl. No.: 14/008,738

(22) PCT Filed: Mar. 22, 2012

(86) PCT No.: PCT/EP2012/055063
§ 371 (c)(1),
(2), (4) Date: Dec. 11, 2013

(87) PCT Pub. No.: WO2012/130708
PCT Pub. Date: Oct. 4, 2012

(65) Prior Publication Data
US 2014/0091710 A1    Apr. 3, 2014

(30) Foreign Application Priority Data

Mar. 31, 2011    (DE) .................. 10 2011 006 580 656

(51) Int. Cl.
*B60Q 1/04* (2006.01)
*B60Q 1/08* (2006.01)
*B60Q 1/14* (2006.01)

(52) U.S. Cl.
CPC ................ *B60Q 1/085* (2013.01); *B60Q 1/143* (2013.01); *B60Q 2300/052* (2013.01); *B60Q 2300/054* (2013.01)

(58) Field of Classification Search
CPC .. B60Q 1/085; B60Q 1/143; B60Q 2300/054; B60Q 1/1423
See application file for complete search history.

(56) References Cited

U.S. PATENT DOCUMENTS

| | | | | |
|---|---|---|---|---|
| 7,429,825 | B2 * | 9/2008 | Kubota | B60Q 1/143 307/10.1 |
| 2004/0201483 | A1 * | 10/2004 | Stam | B60Q 1/1423 340/600 |
| 2011/0196574 | A1 * | 8/2011 | Krieg | B60Q 1/143 701/36 |
| 2011/0260618 | A1 * | 10/2011 | Mueller | B60Q 1/1423 315/83 |

FOREIGN PATENT DOCUMENTS

| | | |
|---|---|---|
| CN | 1751391 A | 3/2006 |
| DE | 10 2008 041355 | 5/2001 |
| DE | 101 16 490 | 10/2002 |

(Continued)

*Primary Examiner* — Jung Kim
(74) *Attorney, Agent, or Firm* — Norton Rose Fulbright US LLP

(57) ABSTRACT

A method for increasing the illumination range of a vehicle, having a step of receiving high beam activation information via an interface, the high beam activation information indicating an option for the glare-free operation of the high beam. The method also includes a step of ascertaining a distance covered by the vehicle in response to receiving the high beam activation information, and a step of providing range-increasing information for increasing the illumination range when the covered distance after receiving the high beam activation information is greater than a predetermined minimum distance, and/or a step of providing at least one value of the increase in the illumination range (illumination range-increasing value) as a function of the distance covered.

11 Claims, 5 Drawing Sheets

(56) References Cited

FOREIGN PATENT DOCUMENTS

| | | |
|---|---|---|
| DE | 10 2005 017933 | 10/2006 |
| DE | 10 2006 045525 | 4/2008 |
| DE | 10 2009 034224 | 4/2010 |
| DE | 10 2009 028344 | 2/2011 |
| EP | 2266837 A1 | 12/2010 |
| JP | 2004098970 | 4/2004 |
| JP | 2007112250 | 5/2007 |
| JP | 2007112250 A | 5/2007 |
| JP | 2011001043 | 1/2011 |
| WO | 2011/015625 | 2/2011 |

* cited by examiner

METHOD AND CONTROL UNIT FOR DISTANCE-DEPENDENT ADJUSTMENT OF THE ILLUMINATION RANGE OF A LIGHTING SYSTEM FOR A VEHICLE

FIELD OF THE INVENTION

The present invention relates to a method for adjusting the illumination range of a lighting system for a vehicle, a control unit for adjusting the illumination range of a lighting system for a vehicle, and a corresponding computer program product.

BACKGROUND INFORMATION

A method for automatically controlling lighting devices, in particular of a motor vehicle, using a brightness sensor is discussed in the document DE 101 16 490 A1. The brightness sensor emits signals, and the lighting devices are switched off after a time interval that begins at the point in time when the signals exceed or fall below a first threshold. A length of the time interval is changeable, in particular increasable.

SUMMARY OF THE INVENTION

Against this background, the present invention presents a method for increasing the illumination range of a vehicle, a control unit for increasing the illumination range of a vehicle, and a corresponding computer program product according to the main claims. Advantageous embodiments result from the respective subclaims and the following description.

In a vehicle lighting system, headlights of an older design may be operated in at least two operating states. One of the operating states is generally referred to as "low beam," and another operating state is generally referred to as "high beam." When the lighting system is operated on high beam, a large quantity of light is emitted from the headlight and illuminates a wide area of a driver's field of vision with a high intensity. When the lighting system is operated on low beam, the emitted light is highly focused and illuminates only a small portion of the driver's field of vision ahead of the vehicle in order to reduce blinding of other road users.

Alternating between low beam and high beam has previously required a direct control instruction from the vehicle driver. Since driving at night with the low beam on is demanding, and hazards are not recognizable until much later than when driving with the high beam on, it is advantageous to be able to drive as long as possible with the high beam on. For this purpose, however, the vehicle driver must continually focus with a high level of concentration in order to deactivate the high beam at the correct point in time and to reactivate it at the correct point in time. Since driving a vehicle at night is already challenging for many vehicle drivers, a delayed switch between high beam and low beam, or even no switch at all, is made due to complacency, forgetfulness, or fatigue. On the one hand, this results in intense blinding of other road users, with a corresponding adverse effect upon them. On the other hand, many vehicle drivers, after they have switched to low beam and the other road user has been passed already, continue to drive with the low beam on although there is no longer a reason to use the low beam. As a result, these vehicle drivers travel in a type of "blind flight," and are only able to recognize hazards inadequately and too late.

A further development in lighting technology has made possible so-called systems having (sliding) illumination range control, which no longer know (only) the two states of low beam and high beam, but, rather, intermediate stages, i.e., which allow a continuous adjustment of the illumination range (between near and far/wide-area).

Accordingly, in the present context the "low beam" state means the state of a low illumination range (near, focused illumination), and the "high beam" state means the state of a high illumination range (wide illumination).

The present invention is based on the finding that the lighting system (in particular the main headlights) of a vehicle may automatically make the adjustment from a low illumination range (low beam) to a high illumination range (high beam) when the vehicle has covered a predetermined distance after there is no longer a reason for operation on low beam. Thus, based on the covered distance, a point may be ascertained at which the high beam is advantageously reactivated, i.e., a certain illumination range is set. Since in darkness, an oncoming vehicle may be recognized, for example, by locating the position of its main headlights, for a direct activation of the high beam, when the main headlights of the oncoming vehicle are at the level of the host vehicle, a driver of the oncoming vehicle could still be in a blinding area of the host vehicle's headlights and be blinded. This may be avoided by waiting for the predetermined distance. If multiple oncoming vehicles are in the blinding area at the same time, the high beam is not activated until there are no longer any vehicles in the blinding area.

The present invention provides a method for increasing the illumination range of a vehicle, having the following steps:
  receiving high beam activation information via an interface, the high beam activation information indicating an option for the glare-free increase of the illumination range;
  ascertaining a distance covered by the vehicle in response to receiving the high beam activation information; and
  providing range-increasing information for increasing the illumination range when the covered distance after receiving the high beam activation information is greater than a predetermined minimum distance, and/or
  providing 306 at least one value of the increase in the illumination range (illumination range-increasing value) as a function of the distance covered.

A high beam may be understood to mean a type of operation of a vehicle headlight which has a larger horizontal and vertical illumination angle compared to a low beam. The high beam is able to illuminate a wide area ahead of a vehicle driver's visual range. The high beam may blind, and thus disturb or endanger, other road users when they are directly illuminated. High beam activation information may be provided by a surroundings recognition device, and may represent a situation in which the high beam may be operated without disturbing or blinding the other road users. For example, the high beam activation information may be provided when no other road users are present in a detection range of the surroundings recognition device.

The high beam activation information may also represent a situation in which no other blindable road users are recognized by the recognition device. A covered distance may represent a path length that is traveled by the vehicle between two path points. For example, the covered distance may be ascertained from a number of wheel revolutions and a rolling diameter of the wheel. The covered distance may also be ascertained from a computation based on an instantaneous speed. A predetermined minimum distance may be understood to mean a safety margin between a path point at which the high beam activation information has been received and a path point at which the high beam is activated. The safety margin may be large enough that the high beam is not activated until an oncoming vehicle has completely passed the vehicle headlights of the host vehicle as expected. The predetermined minimum distance may be changeable. For this purpose, the method may include a step of determining the minimum distance. The illumination range-increasing information may be output to the vehicle headlights via an interface, and may be suitable for activating or changing the state of an illuminant of the headlight.

A value for increasing the illumination range (illumination range-increasing value) may be provided as a function of the distance covered, the value allowing control of the headlights in such a way that their illumination range is increased in a defined manner, usually, controlled more the farther the host vehicle is situated from the site of the occurrence of the high beam activation information. The illumination range-increasing value is usually used for adjusting a certain illumination range. This may be carried out without waiting for the increase in the illumination range (in this case, the minimum distance would be equal to 0).

Otherwise, this may also be carried out in combination with the start of the increase after a minimum distance. In this case, a certain distance (minimum distance) after the occurrence of the high beam activation information is awaited before the increase may be started; the at least one value of the increase must be greater than or at least equal to a distance compared to the minimum distance (starting from the location of the high beam activation information).

According to another specific embodiment of the present invention, the illumination range-increasing information may be provided in the step of providing when the high beam activation information has remained constant while traveling over the predetermined minimum distance after receiving the high beam activation information. As soon as a road user is recognized while covering the minimum distance, the high beam activation information may be reset, or low beam activation information may be provided. This prevents the provision of the illumination range-increasing information.

According to another specific embodiment, a pattern of the increase in the illumination range may be formed, in which the method according to the present invention is carried out for more than one point of the distance covered.

Thus, for example, value pairs (distance, illumination range-increasing value) could be formed which determine the illumination range-increasing pattern. The illumination range-increasing value usually becomes greater with increasing distance. This may occur (piece by piece) linearly or, for example, in a logarithmic relationship between the distance and the illumination range-increasing value. The change in the illumination range-increasing value may take place discretely (causes a stepped increase in the illumination range (step function)) or continuously (for example, by linear interpolation between the value pairs). Other pattern forms are also possible which may be selected in such a way that they are most useful for the particular instantaneous driving situation.

The relationship between distance and illumination range-increasing value may also be represented by a dependency between the speed of the host vehicle and the change in the illumination range-increasing value (i.e., the rate at which the value, and thus the illumination range, changes).

In addition, also in the step of providing, the predetermined minimum distance may be determined, taking into account a roadway class on which the vehicle is present, in addition or as an alternative to a type of roadway in an area in which the vehicle is present. A roadway class may be understood to mean a roadway category which may be associated with the roadway, taking various characteristics into account. For example, roads may be classified according to function, location, and surroundings. Thus, for example, a road may be classified as an urban connecting road having building development, or, for example, as an urban access road having building development or as a suburban connecting road. In addition, connecting roads, for example, may be further subdivided. Examples include expressways, regional highways, highways, or municipal roads.

Depending on the road class, different factors may be considered in assigning the minimum distance. For example, the minimum distance on an expressway may be shorter than on a regional highway. For a developed municipal road with street lighting, providing the illumination range-increasing information may be prevented until the vehicle has left an area having street lighting. A roadway configuration may be understood to mean hilliness or an elevation profile, and curves or a curve profile, of the roadway. For example, a roadway may have elevations and/or curves which limit a maximum visual range, and thus reduce a recognition range for recognizing other road users. In this case, the minimum distance may be extended with respect to a linear roadway pattern. Likewise, the elevations and/or curves may limit an effective range of the high beam. Thus, for example, the high beam may be activated although another road user has already been detected by the surroundings detection device, but the road user is not present within a blinding area of the high beam.

According to another specific embodiment of the present invention, in the step of providing, the predetermined minimum distance may be determined in addition or as an alternative to information concerning an instantaneous traffic situation, also taking into account an instantaneous driving state of the vehicle. An instantaneous driving state may be understood to mean, for example, an instantaneous speed of the vehicle, an instantaneous yaw rate, an instantaneous brightness of the surroundings, an instantaneous time, or an instantaneous system state. Information concerning the instantaneous driving state may be provided by suitable sensors. For example, a shorter minimum distance may be determined at a high speed than at a low speed. Likewise, a shorter minimum distance may be determined at a low yaw rate than at a high yaw rate. A larger minimum distance may be determined at a high brightness level of the surroundings than at a low brightness level of the surroundings.

An instantaneous system state may influence the minimum distance in such a way that, in the event of an error in the surroundings detection device or object recognition, for example, a large standard value for the minimum distance may be used which may provide additional protection against blinding of other road users. An instantaneous traffic situation may be understood to mean information concerning one or multiple vehicles in the surroundings of the vehicle. The information may also be received from sources independent from the vehicle. The traffic situation may also be provided by the surroundings detection device, and may represent, for example, information concerning location, speed, and moving direction of at least one other vehicle. The information may also be accumulated by the surroundings detection device over a previous time period. In particular, a time window of a few minutes or seconds may be considered. For example, based on a high traffic density in an oncoming lane, a high probability of further vehicles on the oncoming lane may be deduced, and thus, the minimum distance may be determined to be longer. In addition, for a passing vehicle, the minimum distance may be influenced based on a differential speed. Thus, a shorter distance may be determined when a high differential speed is ascertained, and a longer minimum distance may be determined when a low differential speed is ascertained.

In another specific embodiment having a step of determining an expected range-reducing point in time for reducing the illumination range, the range-increasing information for increasing the illumination range may be provided in the step of providing when a predetermined minimum switch-on time for the high beam is between a point in time of providing the range-increasing information and the expected illumination range-reducing point in time. A minimum switch-on time may be understood to mean a sought minimum illumination duration for the high beam.

In this way, an unnaturally frequent change between high beam and low beam may be avoided, and a long service life of the headlights may be achieved. For example, an oncoming vehicle may already be recognized, but not yet be present within a blinding area of the high beam. If a time period up to switching off the high beam again is expected to be shorter than the minimum switch-on time, the provision of the range-increasing information may be suppressed. Transmission of incorrect information for the driver of the oncoming vehicle may thus be prevented, since a very brief activation of the high beam may generally be understood as a warning signal, a special signal, or an attention signal.

In an additional specific embodiment of the present invention, the predetermined minimum distance may be adapted in the step of providing, taking into account at least one stored characteristic curve, the characteristic curve representing a relationship between the minimum distance and an instantaneously ascertained parameter. Values of the characteristic curve may be stored in the form of a lookup table. The characteristic curve may represent a relationship of the two variables which is ascertained in advance. The relationship may be nonlinear. One of the variables may be the minimum distance, an increase or a decrease in the minimum distance, or a factor for an increase or a decrease in the minimum distance.

Increases and decreases as well as factors of various characteristic curves may accumulate; negative values or factors may reduce the minimum distance. An instantaneously ascertained parameter may be understood to mean a value that is provided by an appropriate vehicle sensor. Likewise, an instantaneously ascertained parameter may be a value that is determined from multiple parameters. For example, the instantaneous parameter may be an instantaneous speed of the vehicle, an instantaneous yaw rate of the vehicle, a brightness level of the surroundings, a maximum visual range ahead of the vehicle, an instantaneous time of day, or an instantaneous traffic density. Even complicated nonlinear relationships between the minimum distance and various factors may thus be reliably and easily incorporated in the determination of the minimum distance.

In addition, according to another specific embodiment, the predetermined minimum distance may be determined in the step of providing, using an empirical illumination range-increasing model having at least two input variables.

An empirical illumination range-increasing model may be understood to mean a simplified depiction, based on previous travel, for simulating the high beam activation and deactivation. Parameters of the model may be estimated or measured, or may be based on stored observations. In an evaluation of the model, indistinct quantity limits of the factors may be taken into account, and indistinct results may be averaged via geometric considerations, for example. The empirical illumination range-increasing model may include the minimum distance as a parameter, and may optimize its parameters in repeat loops. Complex relationships of multiple factors may thus be taken into account in order to determine the minimum distance.

Moreover, the present invention also includes a control unit for increasing the illumination range of a vehicle, having the following features:

a device for receiving high beam activation information via an interface, the high beam activation information indicating an option for the glare-free increase of the illumination range;

a device for ascertaining a covered distance of the vehicle, which ascertains the covered distance in response to receiving the high beam activation information; and a device for providing range-increasing information for increasing the illumination range when the covered distance after receiving the high beam activation information is greater than a predetermined minimum distance, and/or a device for providing at least one value of the increase in the illumination range (illumination range-increasing value) as a function of the distance covered.

Also as a result of this embodiment variant of the present invention in the form of a control unit, the object of the present invention may be achieved quickly and efficiently.

In the present context, a control unit may be understood to mean an electrical device which processes sensor signals, and as a function thereof emits control signals. The control unit may have an interface which may be formed by hardware and/or software. In a hardware design, the interfaces may be, for example, part of a so-called system ASIC which contains various functions of the control unit. However, it is also possible for the interfaces to be dedicated integrated circuits, or to be composed, at least in part, of discrete components. In a software design, the interfaces may be software modules which are present, for example, on a microcontroller in addition to other software modules.

Also advantageous is a computer program product having program code which may be stored on a machine-readable carrier such as a semiconductor memory, a hard drive memory, or an optical memory, and used for carrying out the method according to one of the above-described specific embodiments when the program is executed on a device which corresponds to a computer.

The present invention is explained in greater detail below as an example, with reference to the appended drawings.

DETAILED DESCRIPTION

Figure 1:
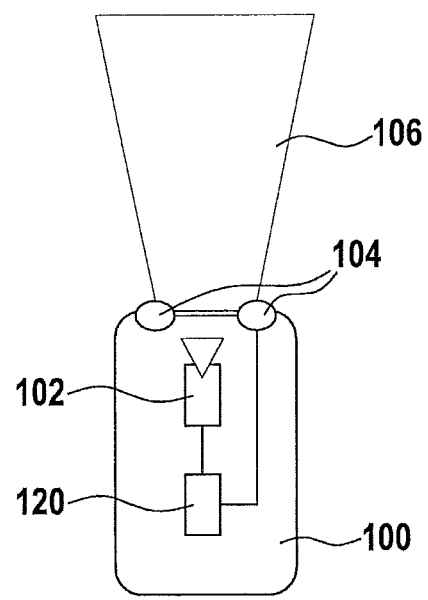
FIG. 1 shows an illustration of a vehicle according to one exemplary embodiment of the present invention.

In the following description of exemplary embodiments of the present invention, the same or similar reference numerals are used for the functionally equivalent elements illustrated in the various figures, so that a repeated description of these elements is dispensed with.

FIG. 1 shows an illustration of a vehicle 100 according to one exemplary embodiment of the present invention. Vehicle 100 has a surroundings detection device 102, headlights 104 having a low beam and a high beam, and a control unit 120 for increasing the illumination range. In the present exemplary embodiment, surroundings detection device 102 is a camera 102 having integrated object recognition. Likewise, the surroundings detection device may be a radar device, for example. The object recognition is configured to recognize other road users. The object recognition is also configured to provide high beam activation information when camera 102 detects no other road user in a blinding area 106 ahead of vehicle 100. In this case, other road users cannot be blinded by headlights 104.

Figure 2:
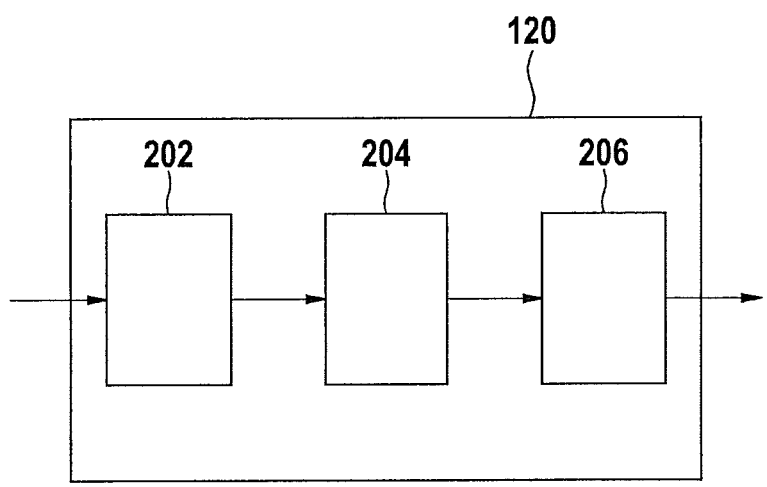
FIG. 2 shows a block diagram of a control unit according to one exemplary embodiment of the present invention.

FIG. 2 shows a block diagram of a control unit 120 according to one exemplary embodiment of the present invention. Control unit 120 may be control unit 120 shown in FIG. 1. Control unit 120 may be used for increasing the illumination range of vehicle 100. Control unit 120 is configured to receive high beam activation information, and on this basis to determine and output range-increasing information. Control unit 120 has a device 202 for receiving high beam activation information, a device 204 for ascertaining a covered distance, and a device 206 for providing range-increasing information. Device 202 is configured to receive the high beam activation information from a surroundings detection device via an interface. The surroundings detection device is configured to recognize a vehicle surroundings, in particular an area ahead of the vehicle, and to recognize other road users in the vehicle surroundings. The high beam activation information indicates an option for operating the high beam without the risk of blinding other road users. Device 204 ascertains the distance covered by the vehicle, beginning at the point in time when the high beam activation information is received. If the covered distance is greater than a predetermined minimum distance, device 206 provides the range-increasing information for increasing the illumination range. The high beam of the vehicle may be switched on in response to the range-increasing information.

Figure 3:
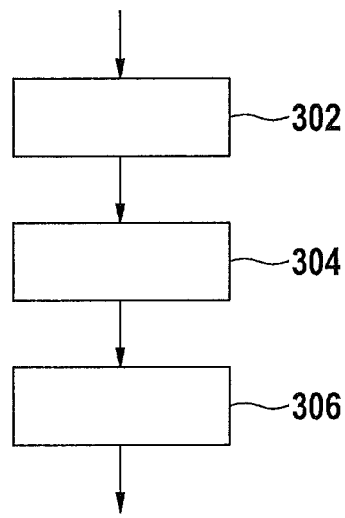
FIG. 3 shows a flow chart of a method for increasing the illumination range of a vehicle according to one exemplary embodiment of the present invention.

FIG. 3 shows a flow chart of a method for increasing the illumination range of a vehicle according to one exemplary embodiment of the present invention. The method has a step 302 of receiving, a step 304 of ascertaining, and a step 306 of providing. The method may be carried out by the control unit shown in FIG. 2. The initial state of the method is a switched-off high beam. After a surroundings detection device 102 of vehicle 100, shown in FIG. 1, for example, has recognized that no other road user is blinded by activating from low beam to high beam, the surroundings detection device outputs high beam activation information. The high beam activation information is read in via an interface in step 302 of receiving.

Beginning with the reading in of the high beam activation information, a distance which the vehicle covers is ascertained in step 304 of ascertaining. If the distance is greater than a predetermined minimum distance, range-increasing information for increasing the illumination range is output in step 306 of providing. Blinding of an oncoming vehicle, for example, may thus be ruled out, since the vehicle continues to travel the minimum distance beyond the point at which the oncoming vehicle has left the detection range of the surroundings detection device. In addition, as the result of waiting for the minimum distance, damping is introduced into the headlight control, which reduces continual switching of the high beam on and off. For multiple road users in succession, in particular vehicles which meet the host vehicle, a brief activation of the high beam between the vehicles may thus be avoided. The minimum distance may be increased or decreased with the aid of multiple influencing factors. For example, at high speed the minimum distance may be shortened, since it may be assumed that an oncoming vehicle likewise has a high speed and therefore travels away more quickly from a blinding area in which a driver of the oncoming vehicle may be blinded.

According to one exemplary embodiment, in information processing the traffic situation or traffic density is included in a control of lighting systems. For a lighting system which adapts the light distribution as a function of the instantaneous traffic situation, the speed of switching from one light distribution to the other may be selected based on multiple input variables. This results in a performance which is comfortable to the driver, and at the same time results in the most optimal illumination of the roadway possible. A debouncing time for a "high beam activation" function which achieves an automatic change between high beam and low beam should be selected in such a way that on the one hand, the driver obtains optimal illumination ahead of his or her vehicle, and on the other hand, this does not result in erratic behavior of the headlights. Thus far it has been possible to use multiple debouncing times. However, these debouncing times are assumed to be fixed, and are configured corresponding to the state of the passing vehicle. In the system presented here, individual traffic situations are recognized and the appropriate debouncing time is selected.

A determination of a debouncing time for a high beam assistant for switching between low beam and high beam for the high beam assist (HBA) function is explained below. Multiple traffic situations, such as expressways, preceding traffic, oncoming traffic, or too short a driving time on high beam are classified in a camera based on the information in the camera. For each of the mentioned situations, a characteristic curve is now determined in which, for example, the speed is plotted against the debouncing time. These characteristic curves may now be appropriately applied or used so that a vehicle-specific behavior may be achieved. It is advantageous for the debouncing time to be selected to be short at high speed, for example in order to minimize travel on low beam when a vehicle is passing, and thus to obtain optimal illumination. The situation "too short a driving time on high beam" describes the case in which a convoy of vehicles is passing the host vehicle, and when during or after the first vehicle passes, a very brief activation of the high beam takes place before the second vehicle arrives.

In addition to the situations mentioned above, further situations may be recognized, and an appropriate characteristic curve for the debouncing may be selected for each. For example, a yaw rate, an average yaw rate over the last x meters, navigation data concerning upcoming curves in the roadway, a length for recognition of another vehicle, i.e., a length of the track, or a characteristic of the track may be used within the image. A high level of dynamics may indicate a hilly stretch of the roadway, and thus a high probability of an oncoming vehicle suddenly appearing.

According to one exemplary embodiment, the debouncing time for a high beam assistant of a vehicle is determined with the aid of the method shown in FIG. 3. Objects at night are recognized with the aid of a dual-purpose camera (DPC) for light and traffic lane algorithms, or a multi-purpose camera (MPC) for all functions on the camera. The objects may be other road users and/or infrastructure objects. If no other vehicle is blinded, an automatic control of the headlights now automatically switches to high beam. To avoid erratic behavior of the headlights, after no further vehicle has been recognized in the image, a certain time, which in the present case is defined over a minimum distance, is awaited until a switch is made to high beam. Thus, a debouncing time or waiting time is awaited. In conventional approaches, this debouncing time is selected only as a function of the host vehicle parameters or as a function of the recognized object parameters. The various waiting times are started, and a switch is not made back to high beam until at least one of the waiting times has elapsed. According to the approach presented here, a waiting distance, not a waiting time, is assumed. This results in an implicit dependency on speed. This has the advantage that the distance traveled on low beam is predefined if no other vehicle is in the visual range of the camera.

In addition, a correlation between the speed and the debouncing time may be utilized with the aid of a characteristic curve. Furthermore, various situations may result in different debouncing times, which in turn may be combined with the aid of fuzzy logic. The debouncing distance may be selected as a function of the roadway type, such as an urban roadway or an expressway, as a function of the instantaneous time of day, as a function of the number of vehicles in a convoy of vehicles which have passed, as a function of the elevation profile of the roadway and/or the curve profile of the roadway, as a function of the distance previously traveled on high beam, or as a function of a profile predefined by the driver. In addition, the instantaneous traffic flow on the traveled roadway may be determined with the aid of a connection to an appropriate server, since there is thus an increased probability of further appearance of vehicles. In the presented approach, the waiting time until a switch is made to high beam depends on multiple independent factors, which are combined into a single debouncing time with the aid of fuzzy logic. These factors may be, for example, the speed of the vehicle, the yaw rate of the vehicle, the number of vehicles that have passed the vehicle while on low beam, the average time or average distance between the last change from low beam to high beam, the distance covered since the last street light, the hilliness or the curviness of the route, the brightness level of the surroundings, or the visual range of the camera.

If a navigation system is present, a high traffic volume may be deduced based on the time of day and the proximity to an urban region, and the time may be appropriately increased. In addition, data concerning the instantaneous traffic flow on the route, the time, and the level of certainty that a recognized object has been tracked, or a length of the track and the roadway type, for example an expressway or urban roadway, may be used.

The debouncing time is determined via situation analysis. For the various situations in question, in each case a characteristic curve may be stored which correlates the resulting debouncing time with the speed or other factors. In addition, the various debouncing times for different situations may be combined.

Figure 4:
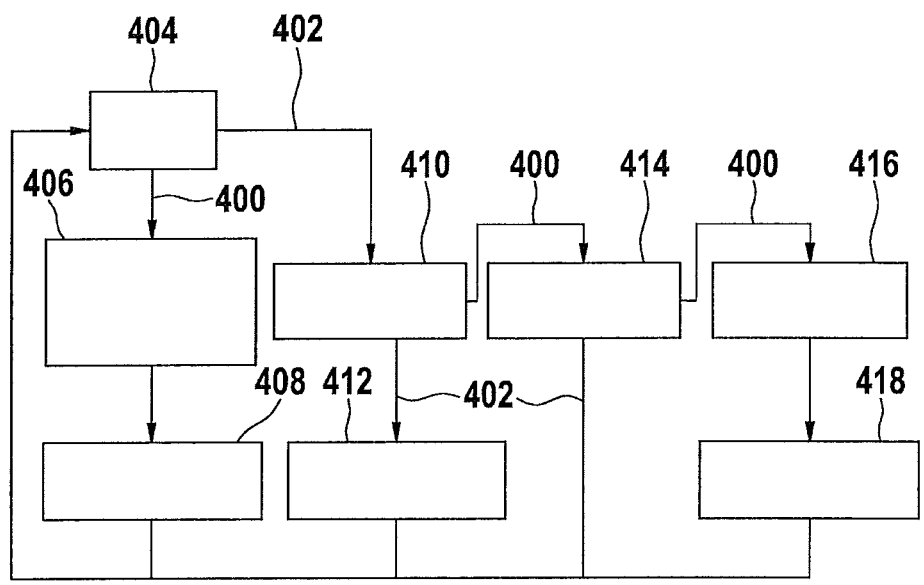
FIG. 4 shows a method structural plan of a method for increasing the illumination range according to another exemplary embodiment of the present invention.

FIG. 4 shows a method structural plan of a method for increasing the illumination range of a vehicle according to another exemplary embodiment of the present invention. The method may be implemented in control unit 120 shown in FIG. 2. A decision and action tree having a plurality of YES branches 400 and NO branches 402 and a plurality of steps 404, 406, 408, 410, 412, 414, 416, 418 is shown. If a vehicle has been recognized, a first query 404 "vehicle recognized?" is followed by an action 406 "evaluate parameters of the vehicle." An evaluation of the parameters of the vehicle is followed by a further action 408 "determine the debouncing time," in which the parameters are taken into account. The debouncing time is defined over a minimum distance. After the debouncing time has been determined, query 404 "vehicle recognized?" is once again made. If no vehicle is recognized, a query 410 "has debouncing time started?" follows. If the debouncing time has not started, an action 412 "start debouncing time" subsequently takes place in which the debouncing time is started. The debouncing time determined in action 408 "determine the debouncing time" is used in action 412 "start debouncing time." If the debouncing time has started, query 404 "vehicle recognized?" is once again made. If the debouncing time for query 410 "has debouncing time started?" has elapsed, a further query 414 "has debouncing time elapsed?" is made, and if the debouncing time has not elapsed, query 404 "vehicle recognized?" is once again made. If the debouncing time for query 414 has elapsed, an action 416 "switch to high beam" follows in which the high beam is activated. A further action 418 "start high beam timer" may subsequently take place in which a high beam timer is activated. If the high beam is activated, query 404 "vehicle recognized?" is once again made. If a vehicle has been recognized, the high beam is deactivated.

Figure 5A:
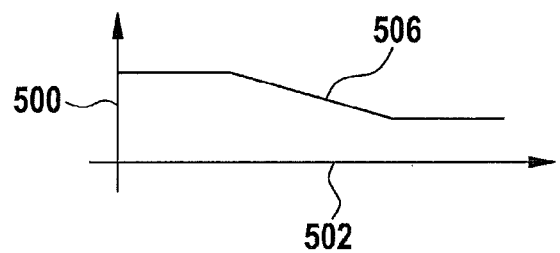
FIG. 5a shows a diagram of a differential speed characteristic curve for influencing a minimum distance according to one exemplary embodiment of the present invention.
Figure 5B:
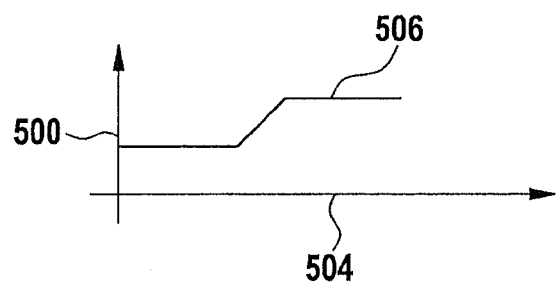
FIG. 5b shows a diagram of a yaw rate characteristic curve for influencing a minimum distance according to one exemplary embodiment of the present invention.

FIGS. 5a and 5b each show a diagram of a characteristic curve for influencing a minimum distance according to one exemplary embodiment of the present invention. In each of the diagrams, a value s 500 is plotted on the ordinate which represents minimum distance 500 or a factor for the minimum distance. A differential speed 502 with respect to a recognized vehicle is plotted in km/h on the abscissa in FIG. 5a. A yaw rate 504 measured on the vehicle is plotted in wheel/s on the abscissa in FIG. 5b.

A differential speed characteristic curve 506 for a disappearance of preceding vehicles is shown in FIG. 5a. At a low differential speed 502, minimum distance s 500 has a high value. The high value remains constant up to a differential speed threshold value. Characteristic curve 506 then drops to a low value, with a constant slope, as differential speed 502 increases. Above a further, higher differential speed threshold value, minimum distance 500 remains constant at the low value. Minimum distance 500 thus changes between a maximum value and a minimum value, minimum distance 500 in a differential speed range being shorter the higher the differential speed 502.

FIG. 5b shows a yaw rate characteristic curve 506. At a low yaw rate 504, minimum distance s 500 has a low value. The low value remains constant up to a yaw rate threshold value. Characteristic curve 506 then increases to a high value, with a constant slope, as yaw rate 504 increases. Above a further, higher yaw rate threshold value, minimum distance 500 remains constant at the high value. Minimum distance 500 thus changes between a minimum value and a maximum value, minimum distance 500 in a yaw rate range being larger the higher the yaw rate 504.

Figure 6:
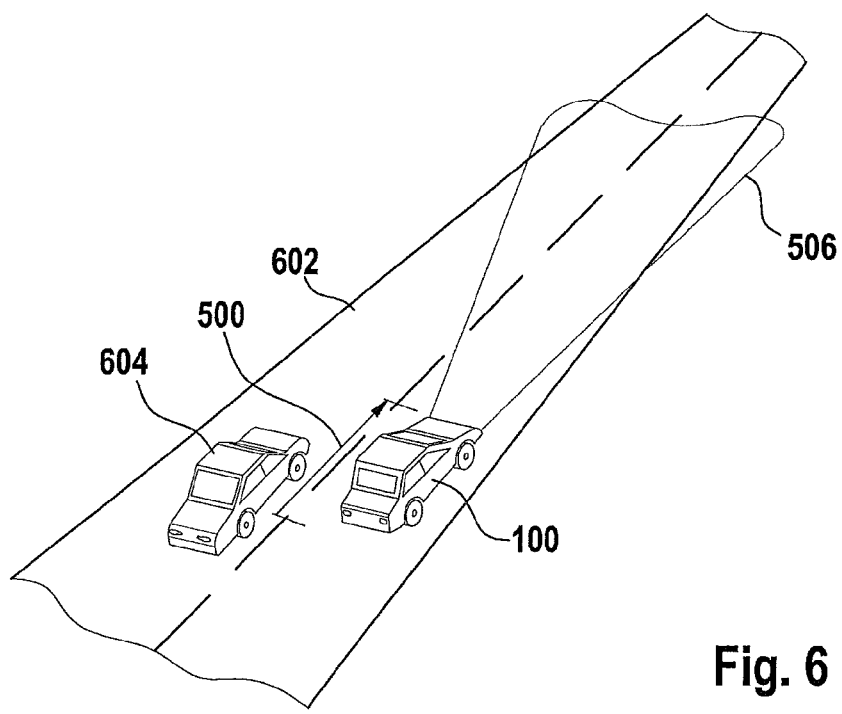
FIG. 6 shows an illustration of a driving situation according to one exemplary embodiment of the present invention.

FIG. 6 shows an illustration of a driving situation in which the high beam of a vehicle 100 is activated after vehicle 100 has traveled a minimum distance 500 according to one exemplary embodiment of the present invention. A roadway 602 having two opposite lanes is shown. The opposite lanes are separated by a broken center line. An oncoming vehicle 604 has passed a vehicle 100. It is dark, and vehicle 100 is traveling with its lights on. A blinding area 506 in front of vehicle 100 is illustrated. The headlights of vehicle 100 have been dimmed as long as vehicle 604 is present in blinding area 506 of vehicle 100. In this simplified example, illustrated blinding area 506 coincides with a headlight cone of the high beam ahead of vehicle 100. When oncoming vehicle 604 has left the blinding area, the control unit of vehicle 100 begins to ascertain a covered distance 500 of vehicle 100 for increasing the illumination range of vehicle 100. As soon as ascertained distance 500 is greater than a predetermined minimum distance, the control unit provides range-increasing information and the high beam is activated. While vehicle 100 covers the minimum distance, oncoming vehicle 604 likewise covers a distance.

Figure 7:
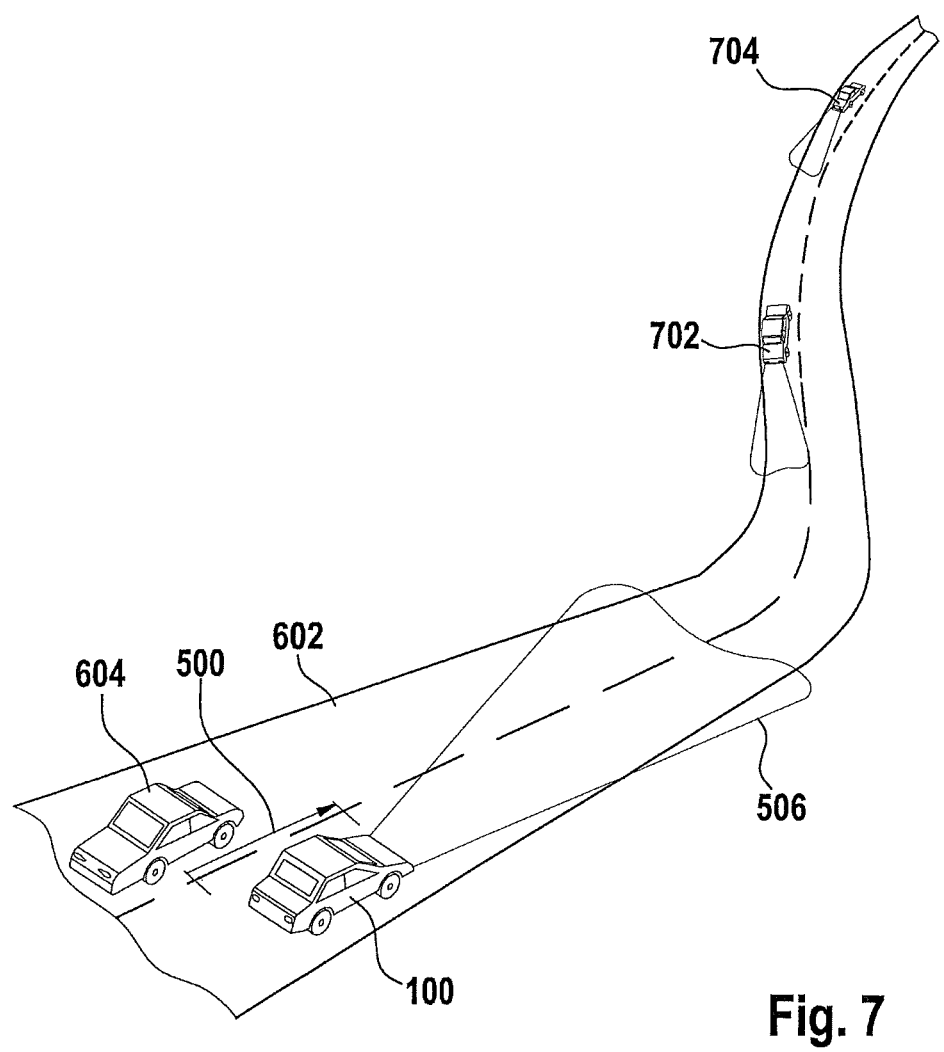
FIG. 7 shows an illustration of another driving situation according to one exemplary embodiment of the present invention.

FIG. 7 shows an illustration of another driving situation in which the high beam of a vehicle 100 is activated according to one exemplary embodiment of the present invention. The same as in FIG. 6, an oncoming vehicle 604 has passed vehicle 100 on roadway 602. No other road user is present in blinding area 506. Vehicle 100 has covered minimum distance 500, and therefore the high beam has been activated by the control unit for increasing the illumination range. Two further vehicles 702, 704 are approaching vehicle 100 which have already been detected by the surroundings detection device of vehicle 100. A precomputed time period elapses until the first of vehicles 702, 704 enters blinding area 506 of vehicle 100. According to the present exemplary embodiment, the precomputed time period is greater than a predefined minimum switch-on time for the high beam. The high beam is therefore switched on despite the recognition of oncoming vehicles 702, 704. The high beam is then deactivated when first oncoming vehicle 702 enters blinding area 506.

Figure 8:
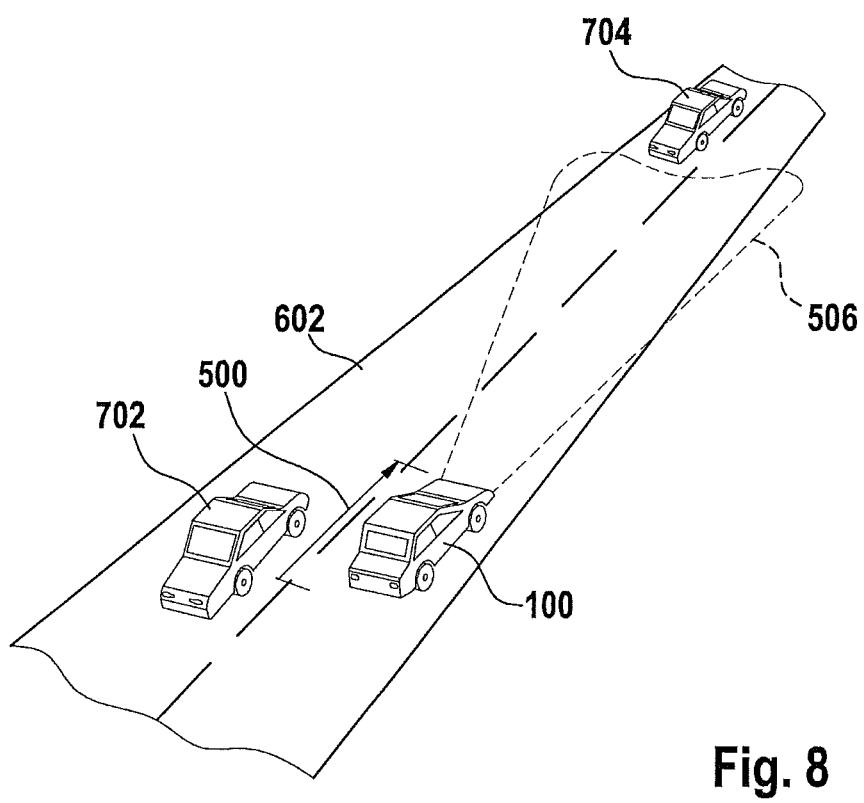
FIG. 8 shows an illustration of another driving situation according to one exemplary embodiment of the present invention.

FIG. 8 shows an illustration of a driving situation in which the high beam of a vehicle 100 is not activated after vehicle 100 has traveled a minimum distance according to one exemplary embodiment of the present invention, since a minimum illumination duration up to a subsequent deactivation is not achievable. A later point in time than in FIG. 7 is shown.

The two oncoming vehicles 702, 704 have reached vehicle 100. Vehicle 702 has already passed vehicle 100. Vehicle 100 has covered minimum distance 500, and no road user is present in blinding area 506. Nevertheless, the high beam is not activated. It is recognized in the control unit that an achievable illumination duration for the high beam is less than a minimum illumination duration, since vehicle 704 is just short of reaching blinding area 506. Therefore, the high beam is not switched on. The situation is thus avoided in which the lights are briefly flashed at the driver of vehicle 704. A too-short illumination of the high beam could be interpreted as a light signal such as a flash of the headlights, resulting in misunderstandings.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment.

Furthermore, method steps according to the present invention may be repeated, and carried out in a sequence different from the one described.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for adjusting the illumination range of a lighting system for a vehicle, the method comprising:
   receiving high beam activation information via an interface, the high beam activation information indicating that present surroundings of the vehicle permit the illumination range to be increased towards a value associated with high beam activation without blinding other road users;
   ascertaining a distance covered by the vehicle in response to receiving the high beam activation information; and
   providing at least one of: (i) range-increasing information when the covered distance after receiving the high beam activation information is greater than a predetermined minimum distance, wherein the range-increasing information increases the illumination range and is not provided when the covered distance is less than the predetermined minimum distance, and (ii) at least one value of the increase in the illumination range (illumination range-increasing value) as a function of the distance covered.

2. The method of claim 1, wherein the illumination range-increasing information is provided when the high beam activation information has remained constant while traveling over the predetermined minimum distance after receiving the high beam activation information.

3. The method of claim 1, wherein multiple values of the increase in the illumination range form an illumination range-increasing pattern for different covered distances in each case.

4. The method of claim 1, wherein at least one of (i) the predetermined minimum distance and range-increasing value(s) is determined in the providing, taking into account a roadway class on which the vehicle is present, and (ii) a type of roadway in an area in which the vehicle is present.

5. The method of claim 1, wherein at least one of the predetermined minimum distance and range-increasing value(s) is determined in the providing, also taking into account an instantaneous driving state of the vehicle.

6. The method of claim 1, wherein at least one of the predetermined minimum distance and range-increasing value(s) is determined in the providing, also taking into account information concerning an instantaneous traffic situation.

7. The method of claim 1, further comprising:
   determining an expected illumination range-reducing point in time for reducing the illumination range, and the range-increasing information being provided such that the illumination range is increased when a predetermined minimum switch-on time for the high beam is between a point in time of providing the range-increasing information and the expected illumination range-reducing point in time.

8. The method of claim 1, wherein at least one of the predetermined minimum distance and range-increasing value(s) is adapted such that the providing takes into account at least one stored characteristic curve, the characteristic curve representing a relationship between the minimum distance and an instantaneously ascertained parameter.

9. The method of claim 1, wherein at least one of the predetermined minimum distance and range-increasing value(s) is determined in the providing, using an empirical illumination range-increasing model having at least two input variables.

10. A control unit for adjusting the illumination range of a lighting system for a vehicle, comprising:
a computer processor configured to:
receive high beam activation information via an interface, the high beam activation information indicating that present surroundings of the vehicle permit the illumination range to be increased towards a value associated with high beam activation without blinding other road users;
ascertain a covered distance of the vehicle, in response to the receiving device receiving the high beam activation information; and
perform at least one of: (i) providing range-increasing information when the covered distance after receiving the high beam activation information is greater than a predetermined minimum distance, wherein the range-increasing information increases the illumination range and is not provided when the covered distance is less than the predetermined minimum distance, and (ii) providing at least one value of the increase in the illumination range (illumination range-increasing value) as a function of the distance covered.

11. A non-transitory computer readable medium having a computer program, which is executable by a processor in an information system, comprising:
a program code arrangement having program code for adjusting the illumination range of a lighting system for a vehicle, wherein executing the program code causes the processor to perform the following:
receiving high beam activation information via an interface, the high beam activation information indicating that present surroundings of the vehicle permit the illumination range to be increased towards a value associated with high beam activation without blinding other road users;
ascertaining a distance covered by the vehicle in response to receiving the high beam activation information; and
providing at least one of: (i) range-increasing information when the covered distance after receiving the high beam activation information is greater than a predetermined minimum distance, wherein the range-increasing information increases the illumination range and is not provided when the covered distance is less than the predetermined minimum distance, and (ii) at least one value of the increase in the illumination range (illumination range-increasing value) as a function of the distance covered.

* * * * *